Feb. 9, 1971 H. E. SHOTWELL 3,561,145
LIGHT DISTRIBUTING LENS SYSTEM
Filed March 5, 1968 2 Sheets-Sheet 1
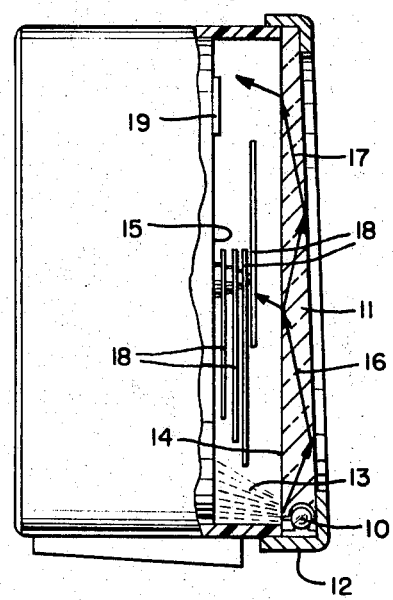
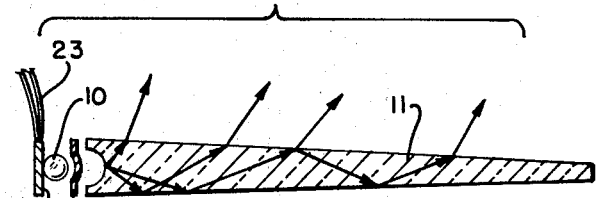
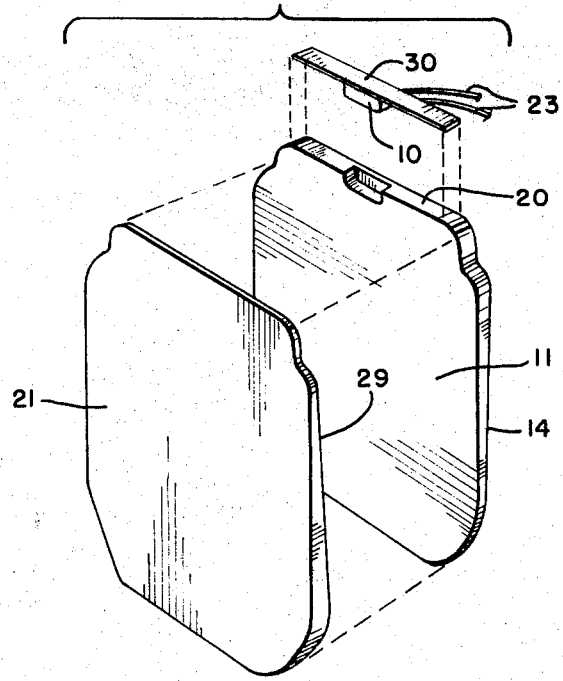
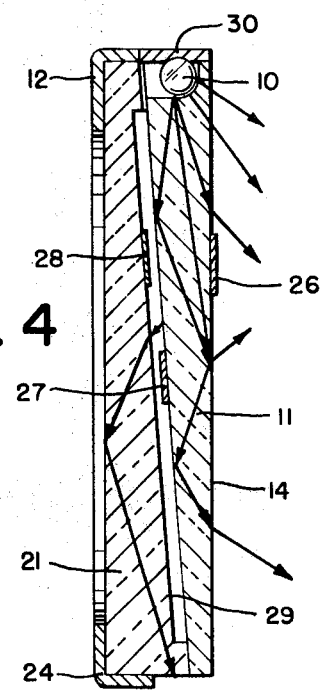
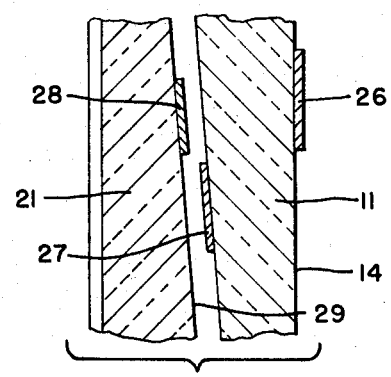
INVENTOR
HENRY E. SHOTWELL
BY Pierce, Edmonds,
Morton, Taylor & Adams
ATTORNEYS

United States Patent Office 3,561,145
Patented Feb. 9, 1971

3,561,145
LIGHT DISTRIBUTING LENS SYSTEM
Henry E. Shotwell, Berwick, Pa., assignor to United States Radium Corporation, Morristown, N.J., a corporation of Delaware
Filed Mar. 5, 1968, Ser. No. 710,590
Int. Cl. G09f 13/18
U.S. Cl. 40—130
1 Claim

ABSTRACT OF THE DISCLOSURE

A light distributing lens system for illuminating a display which employs a tapered three dimensional wedge-shaped panel member of substantially transparent material having a first planar surface proximate to the display and a second planar surface distal from the display so disposed in front of the display to be illuminated that the first planar surface is parallel to the display and the second planar surface is set at a slight angle to the display. The system also employs a light source encased in a recess in the thicker base portion of the tapered wedge-shaped panel member and an opaque frame intimately supporting the periphery of the tapered wedge-shaped panel member in a manner to obscure the light source from external view but to permit the projection of light rays from the light source onto the display directly as well as indirectly through internal reflection from the entire first planar surface of the tapered wedge-shaped panel member.

BACKGROUND OF THE INVENTION (1) Field of the invention

This invention relates to an illuminating system which employs direct lighting and indirect lighting from the same light source. More particularly, it has reference to an improved means for uniformly illuminating instrument faces by combining in a unique manner the principle of internal reflection of light in a tarnsparent medium with direct illumination.

(2) Description of the prior art

Directing light rays into the base of a transparent wedge to diffuse them and achieve a flood lighting effect from the emission of the diffused light from the planar surface of the transparent wedge is not an unfamiliar means of illuminating displays in the aircraft instrument industry. Aircraft instrument dials have heretofore employed the principle of internal reflection of light rays in a transparent wedge to aid in eliminating the shadows on instrument displays which impede readability and in reducing the glare that destroys a pilot's night vision. For light rays which strike a transparent medium at a grazing angle will be reflected away from the surface of the transparent medium and will not enter or be refracted into the transparent medium and so it is that in directing light rays into the base of a tapered wedge shaped transparent panel member, a great number of the light rays will strike the interior planar surfaces of the tapered wedge at a grazing angle and be reflected internally for the entire length of the tapered wedge without exiting therefrom. Eventually, the successive reflections will increase the angle of incidence of the light ray to a point which varies in each transparent material known as its critical angle. At this point, the light ray is no longer reflected, but is emitted from the transparent surface, and in this case, refracted towards a display at a point distant from the light source, thereby producing an indirect, diffuse and uniform illumination.

The principle problem encountered with illumination systems employing edge lighting in the prior art is the reverse of the chief defect experienced in direct illumination systems. Thus, it will be remembered that devices which positioned a light source at the periphery of the instrument face and behind an opaque frame to limit glare and direct the light across the face of the instrument, the greater the distance from the light source, the lesser was the intensity of the illumination. However, in edge lit illuminating systems, the area of the display nearest the light source invariably has a lower level of illumination intensity because fewer light rays reach the critical angle of the transparent medium to be refracted out of the tapered wedge in that area of initial internal reflection.

Several solutions have been proposed in the prior art to increase the level of illumination intensity in this area. Thus, in one case it was proposed that the base of the wedge be so constructed that it form an obtuse angle with the plane of the instrument face or display. Although this construction permitted light rays to strike the planar surface of the tapered wedge proximate to the light source at the critical angle and illuminate the display in this area, it also necessitated increasing the thickness of the wedge to obtain the correct angle which presented optical, space and weight disadvantages. For in presenting a nonparallel planar surface of the tapered wedge to the face of the instrument to be illuminated, the intensity of the illumination of the display was sacrificed because the angle decreased the property of subsantial undirectional emission of the light rays towards the instrument face.

Other manufacturers have serrated the base of the wedge to initially refract the light rays into the transparent wedge at angles smaller than the critical angle (which is measured from the perpendicular to the wedge surface and is approximately 40° for glass) but this too did not completely solve the problem of achieving complete uniformity of illumination. Still others who painted inner portions of the base of the wedge to reflect the internally reflected light rays towards the wedge surface nearest the display at or below the critical angle similarly failed to realize the important goal of basic uniform level of light intensity.

SUMMARY OF THE INVENTION

I have found that thick and serrated base wedges can be eliminated and a basic uniform level of light intensity to illuminate a display can be achieved by other means. Broadly stated, the present invention comprises a light distributing lens system for illuminating a display comprising a tapered three dimensional wedge-shaped panel member of substantially transparent material having a first planar surface proximate to the display and a second planar surface distal from the display, so disposed in front of the display to be illuminated that the first planar surface is parallel to the display and the second planar surface is set at a slight angle to the display, a light source encased in a recess in the thicker base portion of the tapered wedge shaped panel member and an opaque frame intimately supporting the periphery of the tapered wedge-shaped panel member in a manner to obscure the light source from external view but to permit the projection of light rays from the light source onto the display directly as well as indirectly through internal reflection from the entire first planar surface of the tapered wedge-shaped panel member. More particularly, the invention relates to a light distributing lens system for illuminating a display as described above having a transparent tapered wedge-shaped panel member whose exterior edges have been selectively coated with a reflecting material which reflects the light rays in random lateral directions within the lens to produce a more intensely diffused and uniform flood lighting of the display.

Preferred embodiments of the invention are described hereinbelow with reference to the accompanying drawings wherein:

FIG. 1 is a fragmentary section of a first embodiment showing in particular the manner of combining direct illumination with indirect illumination of an instrument face;

FIG. 2 is a vertical fragmentary section of the transparent tapered wedge-shaped panel member and light source showing the convenient introduction of a colored filter in one embodiment of a recess in the transparent panel member;

FIG. 3 is an exploded perspective view of an illumination system employing dual wedges showing a second form of encapsulation of the light source in the transparent panel member;

FIG. 4 is a vertical sectional view of the light source and dual wedges showing the operation of the covering tapered wedge-shaped panel member as a light trap and the substantially unindirectional emission of light rays toward the display;

Figure 6:
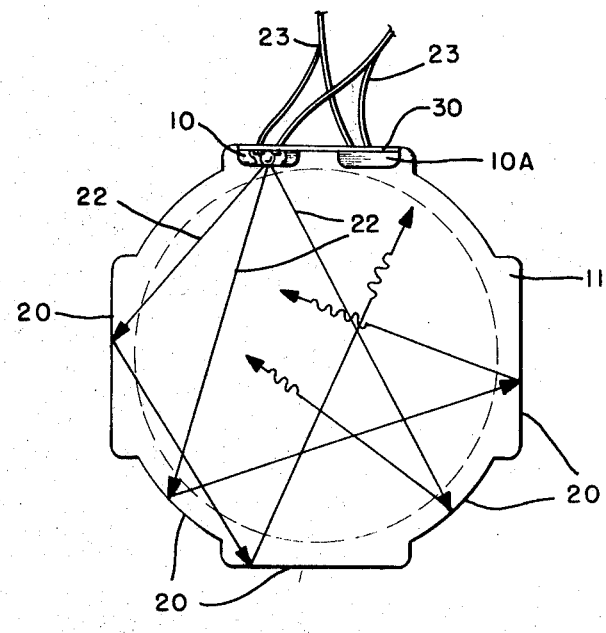

FIG. 5 is a fragmentary horizontal sectional view of the dual transparent panel members which have adhered on their surfaces supplementary display indicia; and FIG. 6 is a frontal sectional view of the transparent tapered wedge-shaped panel member showing an additional embodiment of the light source and the manner in which random internal reflection is accomplished by selectively coating the peripheral edges of the lens with a reflecting material.

DESCRIPTION OF THE PREFERRED EMBODIMENTS

Referring to FIG. 1, there is shown a basic embodiment of a broad concept of the present invention consisting of an instrument housing, a transparent wedge-shaped cover plate in which is recessed a light source which illuminates the instrument indicators and pointers and dial face. Light source 10 is seated in a recess of transparent wedge-shaped panel member 11. The direct rays of its light are shielded from external view by an opaque bezel 12 which is part of the frame that supports and holds in place transparent panel member 11. At the same time, opaque bezel 12 does not restrict the path of light rays 13 which are transmitted directly through planar surface 14 of transparent panel member 11 onto the lower area of instrument face 15. In combination with the direct illumination of instrument face 15, other light rays such as 16 and 17 are reflected within transparent panel member 11 until the critical angle of the transparent medium is reached whereupon they are emitted from various points of wedge 11. The direction of the emitted light is a function of the angle imparted to the tapered transparent panel member. Thus, 85 percent of the light rays emitted from a crown glass water white panel member will be directed towards the instrument face when the angle of the taper is 2°3'. This percentage of light emitted away from the viewer and towards the instrument face can be maintained with polystyrene panel members when the angle of the taper is 2°59' and with Plexiglas when the angle of the taper is 2°4'. The internal reflections engendered by these angles illustrate the mechanism of the diffusion which serves to uniformly illuminate without shadows the entire display including instrument face 15, movable pointers and indicators 18 and indicia 19.

Contributing to the elimination of shadows that would normally be cast by movable pointers and indicators 18 is the fact that a reflecting material, such as nitrocellulose or vinyl white paint, is coated selectively on the peripheral edges of transparent panel member 11 to produce a random scattering of light rays. This may best be seen in FIGS. 3 and 6. Thus, the edges 20 of transparent panel member 11, which as previously indicated, may consist of glass or clear plastic such as polystyrene or Plexiglas are selectively coated with reflecting paint which initiates the omnidirectional light ray paths 22 shown in FIG. 6. Not only does this greater diffusion of the light ray substantially eliminate the effect of shadows on the instrument face, it also utilizes a much greater percentage of the total light input into transparent panel member 11. While the preferred embodiment consists of applying the coatings directly to the edges of the transparent panel member 11, as discussed, satisfactory results have been obtained by applying the reflective coatings to the surface of other components which are physically in contact with the peripheral edges of transparent panel member 11. Typical of such items are bezel 12 or light source holding plate 30.

A further contribution to the elimination of shadows by increased light dispersion is made by the angular configuration of the peripheral edges (FIGS. 3 and 6, Item 20) one to another and the selective use of radii to blend these intersecting plane surfaces.

In addition, it has been found that the light source need not be located symmetrically with respect to the peripheral contours of the lighted panel member 11 because the exceptional diffusion of light eliminates "hot spots" or patterns of high intensity illumination. This permits the addition of a second light source 10A as an insurance measure in the event of the failure of one light bulb. Preferably, the embodiment of the present invention will have two lamps recessed in the base of the tapered wedge-shaped panel member 11 to take advantage of this inexpensive fail-safe measure. In practice, it is extremely difficult to observe from the illumination pattern that a light bulb has failed because the uniformity of illumination is closely maintained due to the improved diffusion. In addition, the electrical connections of the light bulbs 10 are made in parallel to the power source (not shown) so that if one of the bulbs is disconnected from the circuit, the remaining bulb burns brighter and emits a higher light intensity.

Referring to FIGS. 3–4, there is shown a second transparent panel member 21 which acts as a light trap for the stray light rays which may be emitted toward the viewer by the first transparent panel member 11. This forwardly emitted light enters transparent panel member 21, it undergoes a plurality of internal reflections until it reaches one of the edges of the panel member where the stray light is absorbed by opaque bezel 12 or opaque bezel 24. The opaque bezel is typically a metal such as aluminum or zinc, but may be cast from an epoxy resin or similar plastic casting material. The absorption of stray light rays in the manner described above is aided by the vapor deposition of a metallic anti-reflective coating on both surfaces of transparent panel member 21. The anti-reflective coating serves to effectively absorb visible light and thereby reduce the 15 percent glare emanating from illuminated transparent panel member 11 to an unprecedented minimum. It is also clear from FIGS. 3 and 4, that transparent panel member 11 presents a parallel surface to the instrument face and to the viewer because transparent panel member 21 is inverted so that the thick base of that wedge is adjacent to the thin edge of inner wedge 11. Panel member 21 also is designed to perform the function of correcting the optical displacement caused by the variation in thickness throughout the vertical dimension of panel member 11. Presenting a parallel surface to the instrument face means that every point of instrument face 15 will be equidistant from planar surface 14, thereby precluding the operation of the inverse square law of illumination. Ordinarily illumination varies according to the square of the distance from the point of light, but there will be no variation in illumination when there is no variation in distance.

In FIG. 2, there is shown another view of light rays emanating from light source 10 being transmitted through transparent wedge-shaped panel 11 at grazing angles and undergoing a series of internal reflections (grossly simplified in the drawing) until the critical angle is reached and the light emitted out of tapered lens 11. There is also depicted colored light filter 25 which can be conveniently inserted in the base of tapered lens 11 to alter the color of the illumination as desired.

In FIGS. 4 and 5, there is illustrated a means for achieving varied levels of brightness in the same display. Hence, by placing a particular form of indicia 26 on the first planar surface of light transmitting tapered lines 11, a distinctive display having a higher brightness level than the principle display on the instrument face is obtained. A second marking 27 placed on the second planar surface of tapered lens 11 is light transparent and illuminated by transillumination to lower brightness level than marking 26 but still higher than the principle display without interrupting the transmittal of internally reflected light within tapered lens 11. A third and lower level of brightness is obtained by placing marking 28 on the rear planar surface 29 of light trap 21. The brightness levels of indicia 27 and 28 may be varied by selecting indicia material of different density to be transilluminated.

The lens system of the present invention not only has application and utility in aircraft and vehicle instrument panels, but it also has particular application and utility with respect to such instrument faces as household clock dials because light bulbs used in the system have an expected life of 50,000 hours and have a brightness level which is low enough to go unnoticed in a lighted room, yet high enough to be comfortably and easily read in a darkened room.

While operation of the illustrated embodiments of the present invention have been discussed in the foregoing description, variations of the construction and adaptions for other applications will be suggested to those skilled in the art by further consideration of the operating principles of the invention.

What is claimed is:

1. In a light distrbuting lens system for illuminating a display of the type having first and second tapered three-dimensional panel members of substantially transparent material each member having a first planar surface proximate to the dsplay and a second planar surface distal from the display the first member so disposed in front of the display to be illuminated that the inner planar surface of the panel member facing the display is parallel to the display and the outer planar surface of the panel member is set at a slight angle to the display, and the second member having an inner planar surface parallel to the outer planar surface of the first panel member and an outer planar surface parallel to the inner surface of the first panel member and the plane of the display to form a light trap and cover plate for the illumination system, the improvement comprising indicia of uniform optical density adhered to the first and second planar surfaces of the first tapered panel member and to the planar surface of the second tapered panel member more proximate to the display to provide secondary displays of varied brightness levels.

References Cited

UNITED STATES PATENTS

| | | | |
|---|---|---|---|
| 2,772,497 | 12/1956 | Nelson | 40—130K |
| 2,907,869 | 10/1959 | Hudson et al. | 40—130KX |
| 3,040,168 | 6/1962 | Stearns | 40—130KX |
| 3,131,496 | 5/1964 | Schropp | 40—130K |
| 3,140,831 | 7/1964 | Strange | 40—130KX |
| 3,372,504 | 3/1968 | Hardesty | 40—130K |

ROBERT W. MICHELL, Primary Examiner

R. CARTER, Assistant Examiner

U.S. Cl. X.R.

240—1